US012697975B2

(12) United States Patent
Li et al.

(10) Patent No.: US 12,697,975 B2
(45) Date of Patent: Aug. 4, 2026

(54) VEHICLE LANE CHANGING

(71) Applicant: Ford Global Technologies, LLC,
Dearborn, MI (US)

(72) Inventors: Yutong Li, Novi, MI (US); Kenneth Topolovec, Canton, MI (US); Shiva Ashokrao Aher, Canton, MI (US)

(73) Assignee: Ford Global Technologies, LLC,
Dearborn, MI (US)

( * ) Notice: Subject to any disclaimer, the term of this patent is extended or adjusted under 35 U.S.C. 154(b) by 149 days.

(21) Appl. No.: 18/885,793

(22) Filed: Sep. 16, 2024

(65) Prior Publication Data

US 2026/0077766 A1 Mar. 19, 2026

(51) Int. Cl.
 *B60W 30/18* (2012.01)
 *B60W 50/08* (2020.01)
(52) U.S. Cl.
 CPC .... *B60W 30/18163* (2013.01); *B60W 50/082* (2013.01); *B60W 2552/53* (2020.02)
(58) Field of Classification Search
 None
 See application file for complete search history.

(56) References Cited

U.S. PATENT DOCUMENTS

| | | | |
|---|---|---|---|
| 9,669,872 B2 | 6/2017 | Rebhan et al. | |
| 10,049,581 B2 | 8/2018 | Yoon | |
| 10,351,137 B2 | 7/2019 | Shin | |
| 11,577,730 B2 | 2/2023 | Song | |
| 2020/0269844 A1 * | 8/2020 | Ishioka ................ | B60W 10/20 |
| 2023/0009173 A1 | 1/2023 | Reshef | |
| 2023/0028132 A1 * | 1/2023 | Takahashi ....... | B60W 30/18163 |
| 2024/0217561 A1 * | 7/2024 | Kumazaki ......... | B60W 60/0053 |

FOREIGN PATENT DOCUMENTS

CN 116946137 A 10/2023

OTHER PUBLICATIONS

Luo et al., "A dynamic automated lane change maneuver based on vehicle-to-vehicle communication", Transport. Res. Part C (2015), http://dx.doi.org/10.1016/j.trc.2015.11.011.
Xu et al., "Dynamic Cooperative Automated Lane-Change Maneuver Based on Minimum Safety Spacing Model", 2019 IEEE Intelligent Transportation Systems Conference (ITSC) Auckland, NZ, Oct. 27-30, 2019.

\* cited by examiner

*Primary Examiner* — Lail A Kleinman
(74) *Attorney, Agent, or Firm* — Frank A. MacKenzie; Brooks Kushman P.C.

(57) ABSTRACT

A computer includes a processor and a memory, and the memory stores instructions executable by the processor to, in response to an initiation of a lane-change mode by a host vehicle, determine a maximum number of timesteps for which at least one constraint on a host kinematic state of the host vehicle and a target kinematic state of at least one target vehicle is satisfiable; and, in response to the maximum number of timesteps exceeding a timestep threshold, actuate a component of the host vehicle to perform a lane change from a current lane of the host vehicle to a target lane adjacent to the current lane.

20 Claims, 4 Drawing Sheets

VEHICLE LANE CHANGING

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
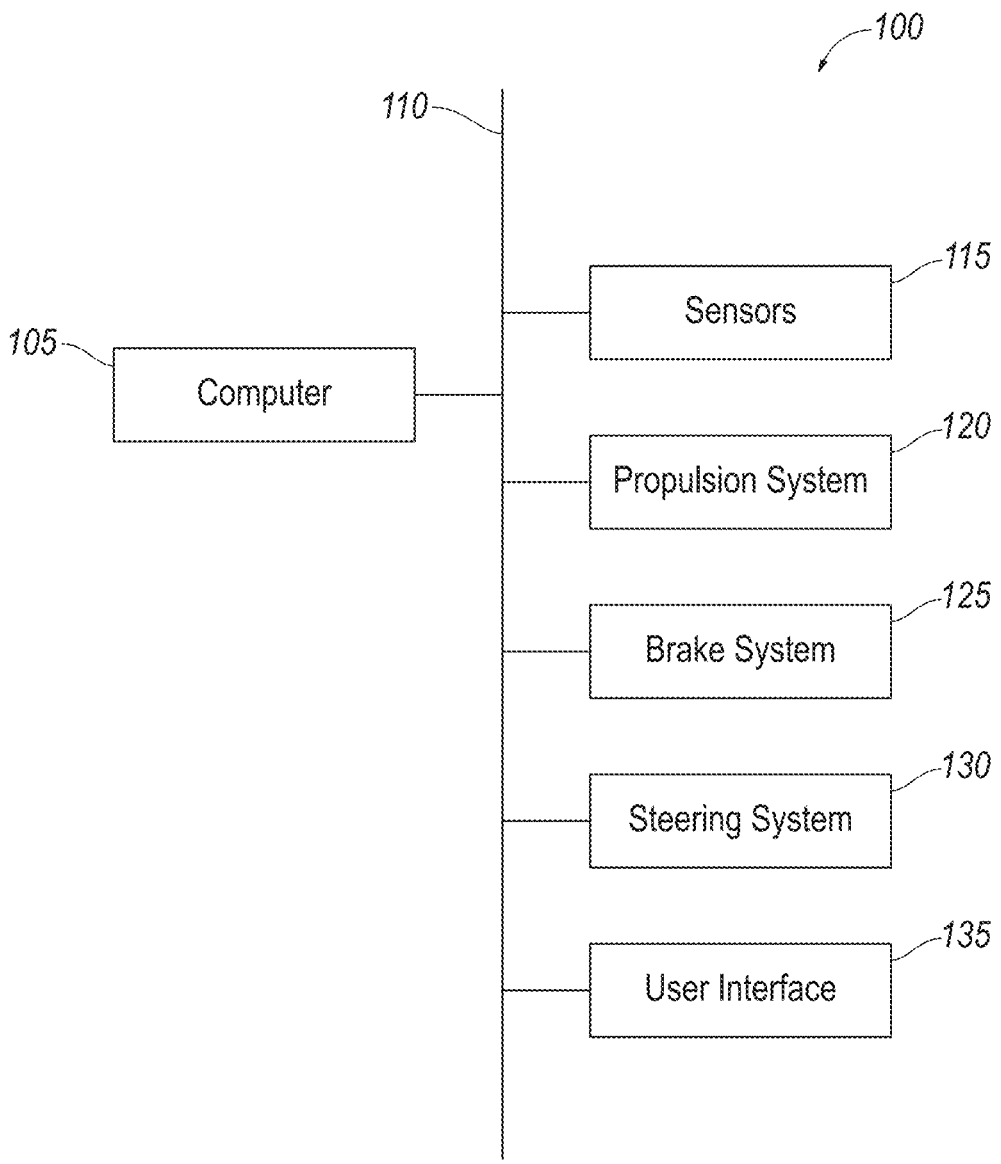
FIG. 1 is a block diagram of an example host vehicle.

The techniques described herein may prevent or delay contact between a host vehicle and at least one target vehicle during a lane change by the host vehicle in certain scenarios, and may do so in a robust manner by actuating a component of the host vehicle, such as autonomous operation or ADAS functions. The techniques herein may be added to an existing algorithm for controlling the host vehicle during a lane change such as reference governor (RG), control barrier function (CBF), model predictive control (MPC), action governor (AG), or responsibility sensitive safety model (RSS), or may be applied when an operator is directly operating the host vehicle. Any of these algorithms on a computer of the host vehicle, or the operator, may provide a nominal control input for the component, such as a braking force for a brake system, a steering angle for a steering system, etc. The computer of the host vehicle may then determine an adjusted control input for the component based on the nominal control input, a host kinematic state of the host vehicle, and a target kinematic state of the at least one target vehicle. A "kinematic state" is a description of the position and/or motion of an entity. The computer may then actuate the component according to the adjusted control input to perform the lane change.

The computer is programmed to, in response to an initiation of a lane-change mode by a host vehicle, determine a maximum number of timesteps for which at least one constraint on the host kinematic state of the host vehicle and the target kinematic state of the at least one target vehicle is satisfiable; and, in response to the maximum number of timesteps exceeding a timestep threshold, actuate a component of the host vehicle to perform the lane change from a current lane of the host vehicle to a target lane adjacent to the current lane. For example, the at least one constraint may include that longitudinal distances between the host vehicle and a leading vehicle in the current lane, a leading vehicle in the target lane, and/or a trailing vehicle in the target lane are each greater than a preset minimum distance. The constraint being "satisfiable" at a future timestep means that control inputs will be available to the host vehicle that will satisfy the constraint (e.g., maintain the minimum distance) at the timesteps up to that future timestep. In most instances, the nominal control input will make the constraint satisfiable for an indefinite number of timesteps, so the adjusted control input will equal the nominal control input. Occasionally, the constraint will not be satisfiable for an indefinite number of timesteps, for example, as a result of extreme changes to the target kinematic state. In that case, the computer actuates the component to perform the lane change in response to the finite maximum number of timesteps exceeding the timestep threshold, and may perform a different maneuver in response to the maximum number of timesteps being below the timestep threshold, such as remaining in the current lane. Using the number of timesteps may provide the host vehicle with more opportunity to prevent contact with the target vehicles in certain scenarios by providing more time for the situation to change. Moreover, using the number of timesteps may allow the lane change to be performed in certain situations in which other algorithms may have aborted the lane change. The other algorithms may have criteria for performing the lane change that rely on kinematic states at the current time. Finally, using the number of timesteps can help provide appropriate control in a more provable manner, which is not provided by adding slack variables in the constraints as in CBF or MPC.

A computer includes a processor and a memory, and the memory stores instructions executable by the processor to, in response to an initiation of a lane-change mode by a host vehicle, determine a maximum number of timesteps for which at least one constraint on a host kinematic state of the host vehicle and a target kinematic state of at least one target vehicle is satisfiable; and, in response to the maximum number of timesteps exceeding a timestep threshold, actuate a component of the host vehicle to perform a lane change from a current lane of the host vehicle to a target lane adjacent to the current lane.

In an example, the instructions may further include instructions to, in response to the maximum number of timesteps being below the timestep threshold for at least a time threshold, actuate the component of the host vehicle to refrain from performing the lane change.

In an example, the instructions may further include instructions to, in response to the initiation of the lane-change mode, actuate the component to maneuver the host vehicle to within a preset distance from a lane line dividing the current lane and the target lane. In a further example, the instructions may further include instructions to actuate the component to maintain the host vehicle within the preset distance from the lane line while determining the maximum number of timesteps.

In an example, the at least one constraint may include a plurality of constraints, and each constraint may be on the host kinematic state and a respective target kinematic state of a respective target vehicle. In a further example, the instructions may further include instructions to determine a plurality of candidate maximum numbers of timesteps for the respective constraints, the maximum number of timesteps being a smallest value of the candidate maximum numbers.

In an example, the at least one target vehicle may include a leading vehicle in the current lane. In a further example, the at least one target vehicle may include a leading vehicle in the target lane.

In another further example, the at least one target vehicle may include a trailing vehicle in the target lane.

In an example, the instructions may further include instructions to determine an adjusted control input for the component of the host vehicle that maximizes the maximum number of timesteps, the determination of the adjusted control input being based on a nominal control input, the host kinematic state, and the target kinematic state; and actuate the component according to the adjusted control input. In a further example, the instructions may further include instructions to actuate the component according to the adjusted control input to perform the lane change.

In another further example, the instructions may further include instructions to actuate the component according to the adjusted control input to travel in the current lane while determining the maximum number of timesteps.

In another further example, the instructions may further include instructions to actuate the component according to the adjusted control input to travel in the target lane after performing the lane change.

In another further example, the instructions may further include instructions to recursively determine for each timestep a set of possible host kinematic states at that timestep for which the at least one constraint is satisfied at that timestep, the set of possible host kinematic states at the timestep being a subset of a set of possible host kinematic states at an immediately previous timestep. In a yet further example, the instructions may further include instructions to perform the recursive determination of the set of possible host kinematic states until a timestep at which the set of possible host kinematic states is empty, the maximum number of timesteps being indicated by the timestep at which the set of possible host kinematic states is empty.

A method includes, in response to an initiation of a lane-change mode by a host vehicle, determining a maximum number of timesteps for which at least one constraint on a host kinematic state of the host vehicle and a target kinematic state of at least one target vehicle is satisfiable; and, in response to the maximum number of timesteps exceeding a timestep threshold, actuating a component of the host vehicle to perform a lane change from a current lane of the host vehicle to a target lane adjacent to the current lane.

In an example, the method may further include, in response to the maximum number of timesteps being below the timestep threshold for at least a time threshold, actuating the component of the host vehicle to refrain from performing the lane change.

In an example, the method may further include, in response to the initiation of the lane-change mode, actuating the component to maneuver the host vehicle to within a preset distance from a lane line dividing the current lane and the target lane.

In an example, the at least one constraint may include a plurality of constraints, each constraint may be on the host kinematic state and a respective target kinematic state of a respective target vehicle, and the method may further include determining a plurality of candidate maximum numbers of timesteps for the respective constraints, the maximum number of timesteps being a smallest value of the candidate maximum numbers.

In an example, the at least one target vehicle may include a leading vehicle in the current lane, a leading vehicle in the target lane, and a trailing vehicle in the target lane.

With reference to the Figures, wherein like numerals indicate like parts throughout the several views, a computer 105 includes a processor and a memory, and the memory stores instructions executable by the processor to, in response to an initiation of a lane-change mode by a host vehicle 100, determine a maximum number of timesteps for which at least one constraint on a host kinematic state of the host vehicle 100 and a target kinematic state of at least one target vehicle 205 is satisfiable; and, in response to the maximum number of timesteps exceeding a timestep threshold, actuate a component of the host vehicle 100 to perform a lane change from a current lane 215 of the host vehicle 100 to a target lane 220 adjacent to the current lane 215.

With reference to FIG. 1, the host vehicle 100 may be any passenger or commercial automobile such as a car, a truck, a sport utility vehicle, a crossover, a van, a minivan, a taxi, a bus, etc. The host vehicle 100 may include the computer 105, a communications network 110, sensors 115, a propulsion system 120, a brake system 125, a steering system 130, and a user interface 135.

The computer 105 is a microprocessor-based computing device such as a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, the user interface 135, and other components via the communications network 110.

The sensors 115 may provide data about operation of the host vehicle 100, for example, wheel speed, wheel orientation, and engine and transmission data (e.g., temperature, fuel consumption, etc.). The sensors 115 may detect the location and/or orientation of the host vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, including objects and/or characteristics of surroundings of the host vehicle 100, such as the target vehicles 205, road lane markings, traffic lights and/or signs, road users, etc. For example, the sensors 115 may include radar sensors, ultrasonic sensors, scanning laser range finders, light detection and ranging (lidar) devices, and image processing sensors such as cameras.

The propulsion system 120 of the host vehicle 100 generates energy and translates the energy into motion of the host vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, for example, an accelerator pedal and/or a gear-shift lever.

The brake system 125 is typically a conventional vehicle braking subsystem and resists the motion of the host vehicle 100 to thereby slow and/or stop the host vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, for example, a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, for example, a steering wheel.

The user interface 135 presents information to and receives information from an operator of the host vehicle 100. The user interface 135 may be located on an instrument panel in a passenger compartment of the host vehicle 100, and/or wherever may be readily seen by the operator. The user interface 135 may include dials, digital readouts, screens, speakers, and so on for providing information to the operator, such as human-machine interface (HMI) elements such as are known. The user interface 135 may include buttons, knobs, keypads, microphone, and so on for receiving information from the operator.

Figure 2:
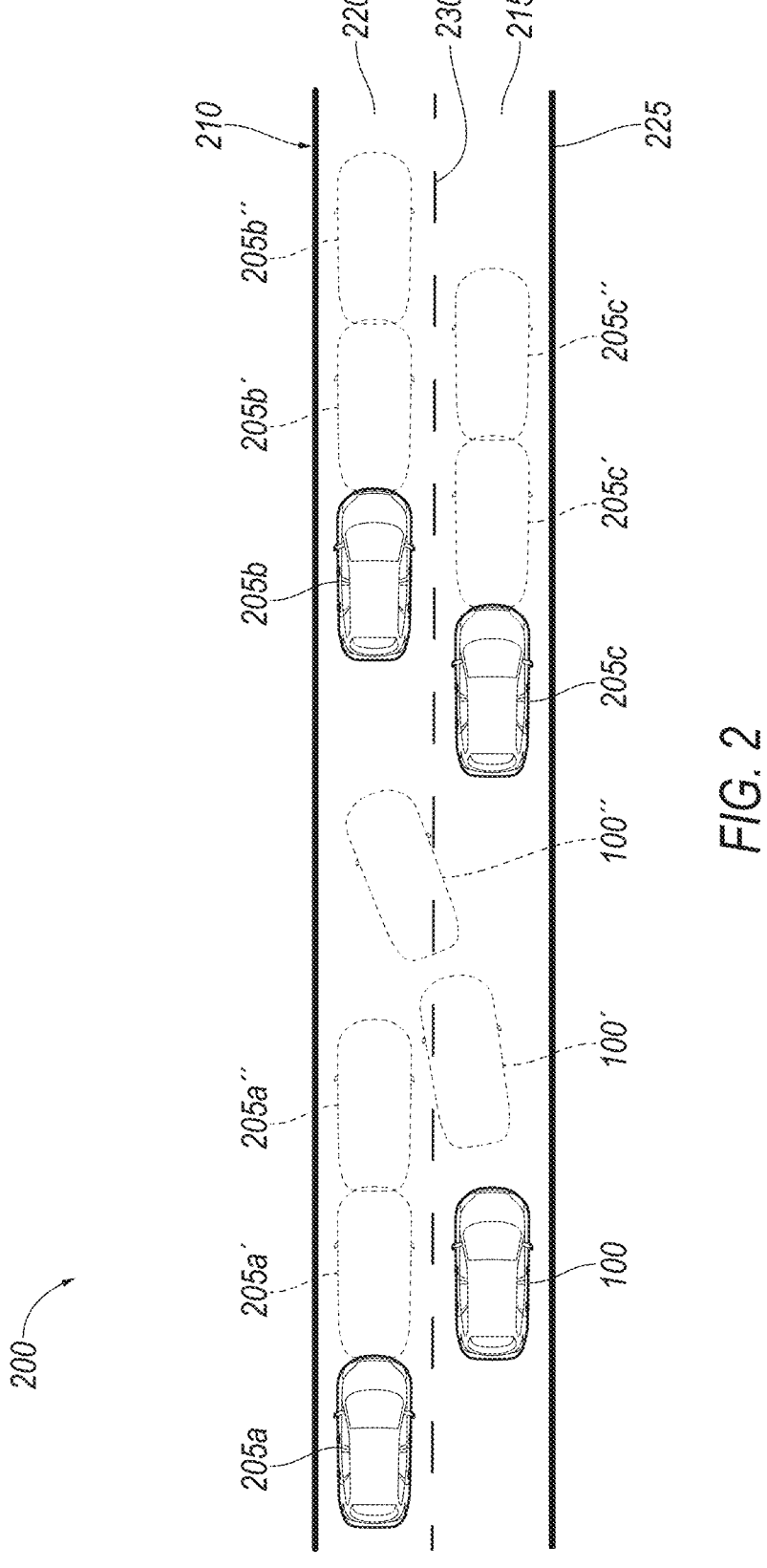
FIG. 2 is a diagrammatic top view of an example lane change by the host vehicle among target vehicles.

With reference to FIG. 2, as the host vehicle 100 travels through an environment 200, the host vehicle 100 may interact with the target vehicles 205 (i.e., vehicles other than the host vehicle 100). For the purposes of this disclosure, the term "host vehicle" is defined as the vehicle that includes the computer 105 and which the computer 105 can control, and the term "target vehicle" is defined as other vehicles besides the host vehicle 100. The computer 105 does not have control over the target vehicles 205. In the example of FIG. 2, the host vehicle 100 is interacting with three target vehicles 205 while performing a lane change from a current lane 215 of a road 210 to a target lane 220 of the road 210. For the purposes of this disclosure, the term "current lane" is defined as a lane of a road 210 in which the host vehicle 100 is traveling before performing the lane change, and the term "target lane" is defined as a lane of a road 210 in which the host vehicle 100 will be traveling after performing the lane change, if the lane change is performed. The target vehicles 205 include a first target vehicle 205a that is a trailing vehicle in the target lane 220, a second target vehicle 205b that is a leading vehicle in the target lane 220, and a third target vehicle 205c that is a leading vehicle in the current lane 215. The first target vehicle 205a may be, among the target vehicles 205 in the target lane 220, the closest target vehicle 205 in the rearward direction from the host vehicle 100. The second target vehicle 205b may be, among the target vehicles 205 in the target lane 220, the closest target vehicle 205 in the forward direction from the host vehicle 100. The third target vehicle 205c may be, among the target vehicles 205 in the current lane 215, the closest target vehicle 205 in the forward direction from the host vehicle 100. The reference numbers for the host vehicle 100 and the target vehicles 205 are labeled with no prime at a beginning timestep, with a prime (') at a later timestep, and with a double prime (") at a still later timestep.

The computer 105 may be programmed to determine the host kinematic state and the target kinematic states. For the purposes of this disclosure, a "kinematic state" is defined as a mathematical description of the position and/or motion of an entity. The kinematic states can include some combination of a position, a heading, a velocity, an acceleration, a yaw rate, etc. The velocity may include a velocity vector and/or a scalar speed. The "host kinematic state" is the kinematic state of the host vehicle 100. The computer 105 may determine the host kinematic state based on data from the sensors 115 (e.g., from a GPS sensor, wheel speed sensors, IMUs, etc.). The "target kinematic state" is the kinematic state of one or more of the target vehicles 205 in the environment 200 with the host vehicle 100. The computer 105 may determine the target kinematic states based on data from the sensors 115 (e.g., positions and velocities of the target vehicles 205 over time from radar, ultrasonic sensors, and/or lidar).

The computer 105 may represent the kinematic states separately for longitudinal and lateral dimensions. For example, the system kinematic state (i.e., the host and target kinematic states) may include relative longitudinal distances between the host vehicle 100 and each target vehicle 205, relative longitudinal velocities between the host vehicle 100 and each target vehicle 205, a lateral distance of the host vehicle 100 relative to the road 210, and a lateral speed of the host vehicle 100, for example, as in the following expressions:

$$x^{lon} = [\, \Delta s^{(1)} \quad \Delta v^{(1)} \quad \Delta s^{(2)} \quad \Delta v^{(2)} \quad \Delta s^{(3)} \quad \Delta v^{(3)} \,]^T$$

$$x^{lat} = [\, Y^{ego} \quad v_y^{ego} \,]^T$$

in which $x^{lon}$ is the longitudinal system kinematic state, $x^{lat}$ is the lateral system kinematic state, the superscript $T$ is the transpose operator, $\Delta s^{(i)}$ is the relative longitudinal position between the host vehicle 100 and the ith target vehicle 205, $\Delta v^{(i)}$ is the relative longitudinal speed between the host vehicle 100 and the ith target vehicle 205, $Y^{ego}$ is the lateral distance of the lateral center of the host vehicle 100 from the lane line 225 of the current lane 215 that is opposite the target lane 220 (i.e., the lane line 225 that the host vehicle 100 moves away from while performing the lane change, which will be referred to as the origin lane line 225), and $$v_y^{ego}$$

is the lateral speed of the host vehicle 100. The relative longitudinal position may be given by the following expression:

$$\Delta s^{(i)} = s^{ego} - s^{(i)}$$

in which i is an index of the target vehicles 205 (e.g., i=1 for the first target vehicle 205a, i=2 for the second target vehicle 205b, and i=3 for the third target vehicle 205c), $s^{ego}$ is the longitudinal position of the host vehicle 100, and $s^{(i)}$ is the longitudinal position of the ith target vehicle 205. The relative longitudinal position is thus positive when host vehicle 100 is ahead of the target vehicle 205 and negative when the host vehicle 100 is behind the target vehicle 205. The relative longitudinal speed may be given by the following expression:

$$\Delta v^{(i)} = v_x^{ego} - v^{(i)}$$

in which $$v_x^{ego}$$

is the longitudinal speed of the host vehicle 100 and $v^{(i)}$ is the longitudinal speed of the ith target vehicle 205.

The techniques below refer to a nominal control input and an adjusted control input. For the purposes of this disclosure, a "control input" is defined as one or more values that control operation of a component of a vehicle. The control input thus serves as a command for the component, such as for at least one of the propulsion system 120, the brake system 125, or the steering system 130 of the host vehicle 100. For example, the components of the host vehicle 100 may include the propulsion system 120 and the brake system 125, and the control input may include an input longitudinal acceleration $$a_x^{ego}$$

of the host vehicle 100. Actuating the propulsion system 120 may include, when the input longitudinal acceleration is positive, setting the throttle to the longitudinal input acceleration. Actuating the brake system 125 may include, when the input longitudinal acceleration is negative, engaging the brake system 125 with a brake force resulting in a negative acceleration equal to the input longitudinal acceleration. The components of the host vehicle 100 may further include the steering system 130, and the control input may include an input lateral acceleration $$a_y^{ego}$$

of the host vehicle 100. Actuating the steering system 130 may include turning the wheel to a steering angle resulting in a lateral acceleration equal to the input lateral acceleration.

The control input may be subject to a prescribed boundary. In other words, the control input used to actuate the component is from a predetermined set of control inputs. The set of control inputs can be chosen based on the capabilities of the component of the host vehicle 100 that is controlled by the control input, for example, the propulsion system 120, the brake system 125, and/or the steering system 130. The set may be represented by the following expression:

$$u_t \in U = \{u \in \mathbb{R}^m : h(u) \le 0\}$$

in which $u_t$ is the control input at timestep t, U is the predetermined set of control inputs, $\mathbb{R}^m$ is the set of vectors of length m populated by real numbers, and h is a function defining whether the argument u is within the capabilities of the component of the vehicle. The length m may be the number of distinct values in the control input (e.g., 1 for longitudinal acceleration alone, 2 for longitudinal acceleration and lateral acceleration, etc.). For example, for longitudinal acceleration of the host vehicle 100, the set of control inputs may be a range from a minimum acceleration to a maximum acceleration, which may be represented as $U_x = [\underline{a}_{host}, \bar{a}_{host}]$, in which $\underline{a}_{host}$ is a minimum acceleration (i.e., a maximum deceleration from braking) of which the brake system 125 of the host vehicle 100 is capable, and $\bar{a}_{host}$ is a maximum acceleration of which the propulsion system 120 of the host vehicle 100 is capable.

The computer 105 may be programmed to determine possible host kinematic states at each timestep using a system dynamics model taking as inputs the control input, host kinematic state, and target kinematic state at the immediately previous timestep. The system dynamics model may determine the host and target kinematic states $x_{t+1}$ at timestep t+1 based on (e.g., as a function of) the host and target kinematic states $x_t$, the control input $u_t$, and the disturbance input $w_t$ at the immediately previous timestep t, as in the following expression:

$$x_{t+1} = f(x_t, u_t, w_t)$$

The system dynamics model may be a physics-based kinematic model, as is known. The specific system dynamics model may be chosen based on, for example, the ADAS feature being controlled.

For example, the system dynamics model may be split into a longitudinal model and a lateral model. The longitudinal model may be a discrete-time dynamical model in one spatial dimension of the change in relative longitudinal position between the host vehicle 100 and each of the target vehicles 205 and of the change in relative velocity between the host vehicle 100 and each of the target vehicles 205, as in the following expressions:

$$\Delta s^{(i)}(t+1) = \Delta s^{(i)}(t) + T_s \Delta v^{(i)}(t) + \frac{T_s^2}{2} a_x^{ego}(t) - \frac{T_s^2}{2} a_x^{(i)}(t)$$

$$\Delta v^{(i)}(t+1) = \Delta v^{(i)}(t) + T_s a_x^{ego}(t) - T_s a_x^{(i)}(t)$$

in which $T_s$ is the duration of a timestep, $$a_x^{ego}$$

is the longitudinal acceleration of the host vehicle 100, and $$a_x^{(i)}$$

is the longitudinal acceleration of the ith target vehicle 205. In this example, the control input $u^{lon}$ is the host longitudinal acceleration $$a_x^{ego},$$

and the disturbance input w is the target longitudinal acceleration $$a_x^{(i)}.$$

The computer 105 may run the longitudinal model for each of the target vehicles 205 (e.g., for i=1, 2, 3).

The lateral model may be a discrete-time dynamical model in one spatial dimension of the change in lateral position of the host vehicle 100, as in the following expressions:

$$Y^{ego}(t+1) = Y^{ego}(t) + T_s v_y^{ego}(t)$$

$$v_y^{ego}(t+1) = v_y^{ego}(t) + T_s a_y^{ego}(t)$$

In this example, the control input $u^{lat}$ is the host lateral acceleration $$a_y^{ego},$$

and the disturbance input w is not included.

Figure 3:
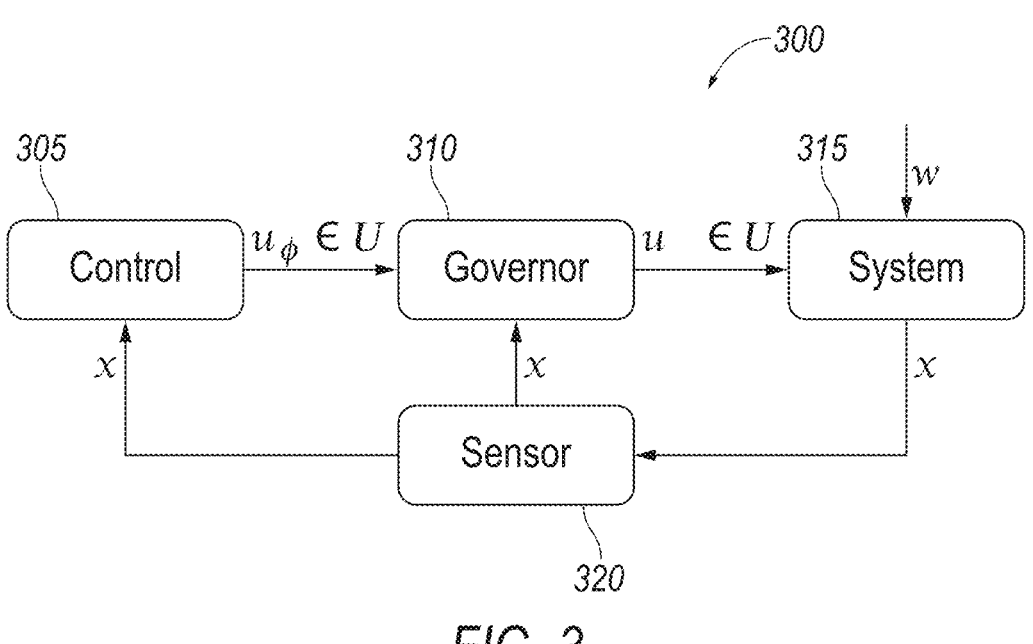
FIG. 3 is a block diagram of an example feedback loop for controlling the host vehicle.

FIG. 3 is a block diagram of a feedback loop 300 for controlling the host vehicle 100. The memory of the computer 105 stores executable instructions for performing the blocks of the feedback loop 300 and/or programming can be implemented in structures such as mentioned above. The feedback loop 300 may iterate once per timestep. As a general overview, a control block 305 receives the host and target kinematic states as measured by the sensors 115. The control block 305 outputs a nominal control input. A governor block 310 receives the nominal control input and the host and target kinematic states. The governor block 310 outputs the adjusted control input. A system block 315 actuates the host vehicle 100 100 according to the adjusted control input, resulting in the actual host and target kinematic states for the next timestep. A sensor block 320 determines the host and target kinematic states based on measurements of the environment 200 by the sensors 115.

In the control block 305, the computer 105 may be programmed to determine the nominal control input $u_\varphi$, for example, based on the host kinematic state and the target kinematic state (represented collectively as a system state x). The control block 305 receives the host kinematic state and target kinematic state from the sensor block 320. The computer 105 may determine the nominal control input $u_\varphi$ using an algorithm for controlling the host vehicle 100 such as reference governor (RG), control barrier function (CBF), model predictive control (MPC), action governor (AG), or responsibility sensitive safety model (RSS), as are known. Alternatively or additionally, the computer 105 may receive the nominal control input $u_\varphi$ from the operator of the host vehicle 100 (e.g., via the accelerator pedal for the propulsion system 120, the brake pedal for the brake system 125, and/or the steering wheel for the steering system 130). For example, the computer 105 may determine the nominal control input $u_\varphi$ using one of the ADAS features or algorithm for controlling the host vehicle 100 when that ADAS feature or algorithm is actively controlling the host vehicle 100 and may receive the nominal control input $u_\varphi$ from the operator otherwise.

In the governor block 310, the computer 105 is programmed to determine the adjusted control input u for the component based on the nominal control input $u_\varphi$, the host kinematic state, and the target kinematic state, as will be described in more detail below with respect to FIG. 4. The governor block 310 receives the nominal control input $u_\varphi$ from the control block 305 and the host and target kinematic states x from the sensor block 320.

In the system block 315, the computer 105 actuates the component of the vehicle according to the adjusted control input u. The "output" of the system block 315 is the actual host and target kinematic states resulting from the actuation of the host vehicle 100 and from a disturbance input w. The disturbance input w represents unmeasured factors that may affect the host and target kinematic states x (e.g., actions by the target vehicles 205).

In the sensor block 320, the computer 105 may receive data from the sensors 115 measuring the effects on the world from the system block 315. The computer 105 may determine the host and target kinematic states x from the data from the sensors 115, for use by the control block 305 and the governor block 310 in the next timestep.

Figure 4:
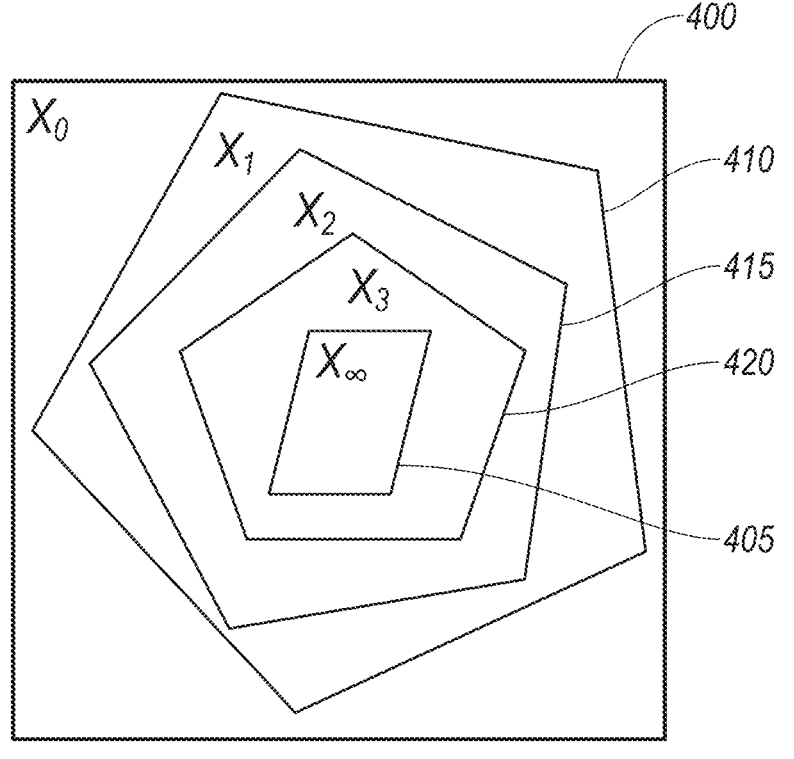
FIG. 4 is a diagram of example sets of states of the host vehicle satisfying a constraint for different numbers of timesteps.

With reference to FIG. 4, the determination of the adjusted control input uses at least one constraint on the host kinematic state and target kinematic state. The constraints may be represented as an initial set 400 $X_0$ of possible host and target kinematic states $x_t$ at a particular timestep t. FIG. 4 represents two dimensions of the host and target kinematic states x, but the host and target kinematic states x may have more dimensions. The constraint may be chosen to ensure a buffer between the host vehicle 100 and the target vehicles 205 at the current timestep t in a manner suitable for the component of the host vehicle 100 that is being controlled (e.g., for the type of ADAS feature being implemented). For example, when the host vehicle 100 is traveling forward in the current lane 215, the constraint may be or include that the longitudinal distance between the host vehicle 100 and the third target vehicle 205c (i.e., the leading vehicle in the current lane 215) is greater than a predetermined distance, as given in the following expression:

$$\Delta s^{(3)} \le -d^{thr}$$

in which $d^{thr}$ is the predetermined distance. (The negative sign and use of the less-than-or-equal operator is from the definition of the relative longitudinal distance above.) As will be described in more detail below, the at least one constraint may change based on the lateral position of the host vehicle 100. The at least one constraint may therefore be differently defined at different future timesteps.

The computer 105 is programmed to determine the adjusted control input for the component based on the nominal control input, the host kinematic state, and the target kinematic state, such that the adjusted control input maximizes the number of timesteps for which the at least one constraint on the host kinematic state and target kinematic state is satisfiable. The adjusted control input may maximize the number of timesteps for which the constraint on the host kinematic state and target kinematic state is satisfiable across a range of target kinematic states. In other words, if the host vehicle 100 is actuated according to the adjusted control input, then at each timestep before the maximum number, a control input exists that results in a host kinematic state that, combined with any target kinematic state in the range, satisfies the constraint. At a given timestep t less than the maximum number, the computer 105 executes the system dynamics model to determine a prediction $x_{t+1}$ for the adjusted control input $u_t$, the current host and target kinematic state $x_t$, and any disturbance input w to the target kinematic state within a range W, and the prediction $x_{t+1}$ is a member of the initial set 400 $X_0$, as in the following expression:

$$x_{t+1} = f(x_t, u_t, w) \in X_0, \forall w \in w$$

In other words, host and target kinematic state $x_{t+1}$ is an element of the set of predictions of the system dynamics model for the adjusted control input $u_t$ and the current host and target kinematic state $x_t$, for the range W of disturbances to the target kinematic state that is a subset of the initial set 400 $X_0$, as in the following shorthand expression:

$$x_{t+1} \in f(x_t, u_t, W) \subset X_0$$

The range W may be a predetermined range and may be stored in the memory of the computer 105. The range W may be chosen to encompass most behavior by the target vehicles 205.

As an overview of determining the adjusted control input, the computer 105 may attempt to determine a first adjusted control input that minimizes an objective function of the host vehicle 100 and for which the constraint is satisfiable for an indefinite number of timesteps. The constraint being satisfiable for an indefinite number of timesteps may be represented by an indefinite-timestep set 405 $X_\infty$ consisting of possible host and target kinematic states x for which the constraint is satisfied at a current timestep and permit the constraint to be satisfied for an indefinite number of timesteps. As shown in FIG. 4, the indefinite-timestep set 405 $X_\infty$ is a subset of the initial set 400 $X_0$. If the computer 105 identifies such a first adjusted control input, then the first adjusted control input is used as the adjusted control input. In response to the computer 105 being unable to determine the first adjusted control input (e.g., the indefinite-timestep set 405 $X_\infty$ being empty, the determination of the first adjusted control input described below being infeasible, etc.), the computer 105 determines a second adjusted control input that maximizes a finite number of timesteps for which the constraint is satisfiable. To do so, the computer 105 recursively determines for each timestep a set of possible host kinematic states at that timestep for which the constraint is satisfied at that timestep. Each set of possible host kinematic states at one timestep is a subset of a set of possible host kinematic states at an immediately previous timestep. In the example of FIG. 4, a first set 410 $X_1$ consists of members for which the constraint is satisfiable for at least one timestep, a second set 415 $X_2$ consists of members for which the constraint is satisfiable for at least two timesteps, and a third set 420 $X_3$ consists of members for which the constraint is satisfiable for at least three timesteps, and so on.

Each set is a subset of the set for the immediately previous timestep (e.g., $X_3 \subseteq X_2 \subseteq X_1 \subseteq X_0$, as illustrated in FIG. 4). The recursion continues until a timestep k*+1 for which the set of possible host kinematic states is empty, and the second adjusted control input is what results in the last nonempty set, for the timestep k*. The second adjusted control input is used as the adjusted control input.

To begin the determination of the adjusted control input, the computer 105 may determine whether the first adjusted control input exists for which the at least one constraint is satisfiable for an indefinite number of timesteps, in other words, a value for $u_t$ exists that satisfies the following expression:

$$x_{t+1} = f(x_t, u_t, w) \in X_\infty, \forall w \in w$$

For example, the computer 105 may execute the control block 305 and determine whether the nominal control input satisfies an internal constraint of the algorithm for controlling the host vehicle 100. For example, the computer 105 may determine whether the target vehicle 205 of interest is outside of a virtual boundary defined by a control barrier function (CBF), as is known. In that case, the computer 105 sets the first adjusted control input to the nominal control input. The computer 105 may determine whether the first adjusted control input exists for which the host kinematic state is in a set of host kinematic states satisfying the constraint. The set may be defined by the internal constraint of the algorithm used in the control block 305. The set may be a control invariant set, for example, a robust control invariant set. As is known in the field of control theory, a set is robust control invariant if there exists a feedback that maps states of the system to admissible control inputs so that every trajectory from an initial state in the set that follows the feedback remains in the set for all time. In this case, the set is the indefinite-timestep set 405 $X_\infty$, and the state of the system is the host and target kinematic states x. Certain algorithms for controlling the host vehicle 100 are proven to have robust control invariant sets when their internal constraints are satisfied, such as control barrier function (CBF), robust model predictive control (RMPC), reference governor (RG), etc.

If at least one first adjusted control input exists, the computer 105 may determine the first adjusted control input that minimizes an objective function describing the host vehicle 100. The objective function may take as inputs the control input u and components of the host kinematic state. For example, the computer 105 may optimize the first adjusted control input to provide the minimum value for the objective function resulting in a host kinematic state that, for all the target kinematic states in the range, is in the indefinite-timestep set 405, as in the following expression:

$$u_{c,\infty} = \underset{u \in U}{\operatorname{argmin}} J_t(u) \text{ s.t. } f(x_t, u, W) \subset X_\infty$$

in which $u_{t,\infty}$ is the first adjusted control input at the timestep t, "argmin" returns the argument of a function that minimizes the value of that function, $J_t$ is the objective function at the timestep t, and "s.t." stands for "such that." The first adjusted control input $u_{t,\infty}$ is limited to the predetermined set U of control inputs available to the component. The first adjusted control input that minimizes the objective function of the host vehicle 100 may be determined as part of the algorithm for controlling the host vehicle 100 from the control block 305.

The computer 105 may be programmed to, in response to the first adjusted control input not existing, determine the second adjusted control input. The second adjusted control input maximizes a finite number of timesteps for which the at least one constraint on the host kinematic state and target kinematic state is satisfiable; for example, the second adjusted control input results in a host kinematic state that, for all the target kinematic states in the range W, is in the kth set $X_k$ of possible host and target kinematic states satisfying the constraint for the largest number k of timesteps. The computer 105 may determine the second adjusted control input such that the predictions of the system dynamics model for the current host and target kinematic state $x_t$ and the second adjusted control input $u_{t,k}$ for all the target kinematic states in the range W is a subset of the kth set $X_k$ of possible host and target kinematic states satisfying the constraint for the largest number k of timesteps, as in the following expression:

$$u_{t,k} \in U \text{ s.t. } f(x_t, u_{t,k}, W) \subset \tilde{X}_k$$

in which $\tilde{X}_k$ is a nonstrict subset of the kth set $X_k$ (i.e., $\tilde{X}_k \subseteq X_k$), which is constructed as described below. The second adjusted control input $u_{t,k}$ is limited to the predetermined set U of control inputs available to the component.

The computer 105 is programmed to recursively determine for each timestep k a set $\tilde{X}_k$ of possible host kinematic states x at that timestep k for which the at least one constraint is satisfied at that timestep k. The set $\tilde{X}_k$ of possible host kinematic states at the timestep k is a subset of a set $\tilde{X}_{k-1}$ of possible host kinematic states at an immediately previous timestep k−1. The computer 105 thus determines the set $\tilde{X}_k$ of possible host kinematic states at each timestep k such that a possible control input u exists for which the set $\tilde{X}_k$ of possible host kinematic states at the timestep k is a subset of the set $\tilde{X}_{k-1}$ of possible host kinematic states at the immediately previous timestep k−1. For example, the set $\tilde{X}_k$ may equal the intersection of the initial set 400 $X_0$ and the set of values for the host and target kinematic states x for which a control input u exists such that the predictions of the system dynamics model of x and u for the predetermined range of target kinematic state changes W is a subset of the set $\tilde{X}_{k-1}$, for example as given in the following expression:

$$\tilde{X}_k = X_0 \cap \{x \in \mathbb{R}^n : \exists \, u \in U \text{ s.t. } f(x, u, W) \subset \tilde{X}_{k-1}\}$$

The determination of the set $\tilde{X}_k$ is recursive because the determination depends on the previous determination of the set $\tilde{X}_{k-1}$. The computer 105 may perform the recursive determination of the set $\tilde{X}_k$ of possible host kinematic states until a timestep k*+1 at which the set $\tilde{X}_{k*+1}$ of possible host kinematic states is empty. The second adjusted control input $u_{t,k*}$ is taken from the control inputs u leading to the final nonempty set $\tilde{X}_{k*}$, and is used as the adjusted control input $u_t$. The number k* of timesteps is indicated by the timestep k*+1 at which the set $\tilde{X}_{k*+1}$ of possible host kinematic states is empty (i.e., is one less than the timestep k*+1). The computer 105 outputs the number k* of timesteps for which the constraint is satisfied (i.e., the index of the final nonempty set $\tilde{X}_{k*}$).

Returning to FIG. 2, the at least one constraint may include a plurality of constraints. Each constraint may be on the host kinematic state and a respective target kinematic state of a respective target vehicle 205. For example, one or more of the constraints may be on the longitudinal distance between the host vehicle 100 and the respective target vehicle 205, such as that the longitudinal distance between the host vehicle 100 and the respective target vehicle 205 is greater than the predetermined distance. The target vehicles 205 for which constraints are applied may include the first target vehicle 205a (i.e., the trailing vehicle in the target lane 220), the second target vehicle 205b (i.e., the leading vehicle in the target lane 220), and the third target vehicle 205c (i.e., the leading vehicle in the current lane 215), as in the following expressions:

$$\Delta s^{(1)} \geq d^{thr}$$
$$\Delta s^{(2)} \leq -d^{thr}$$
$$\Delta s^{(3)} \leq -d^{thr}$$

These constraints will be referred to as the longitudinal constraints.

The computer 105 may be programmed to select the constraints to be applied based on the lateral position of the host vehicle 100 with respect to the lanes 215, 220. For example, the computer 105 may select the constraints according to which of the current lane 215 or target lane 220 the host vehicle 100 is occupying. The computer 105 may select the longitudinal constraint with respect to the third target vehicle 205c in response to the host vehicle 100 being fully within the current lane 215. The computer 105 may select the longitudinal constraints with respect to the first target vehicle 205a, the second target vehicle 205b, and the third target vehicle 205c in response to the host vehicle 100 being partially within the current lane 215 and partially within the target lane 220. The computer 105 may select the longitudinal constraint with respect to the second target vehicle 205b in response to the host vehicle 100 being fully within the target lane 220, as collected in the following expressions:

$$\Delta s^{(3)} \leq -d^{thr} \qquad\qquad \text{if } Y \leq L - \frac{w_h}{2}$$
$$\Delta s^{(1)} \geq d^{thr}, \Delta s^{(2)} \leq -d^{thr}, \Delta s^{(3)} \leq -d^{thr} \quad \text{if } L - \frac{w_h}{2} < Y \leq L + \frac{w_h}{2}$$
$$\Delta s^{(2)} \leq -d^{thr} \qquad\qquad \text{if } Y > L + \frac{w_h}{2}$$

in which L is the width of the current lane 215 and $w_h$ is the width of the host vehicle 100. Thus, the computer 105 selects different sets of constraints for different timesteps during the lane change.

The computer 105 may be programmed to perform the lane change according to a series of phases. As a general overview, the phases may include an initiation phase, a negotiation phase, a lane-line crossing phase, and a target-lane phase. In response to the lane-change mode being initiated (referred to as the initiation phase), the computer 105 performs the negotiation phase and determines whether to complete or abort the lane change, as will be described below. Upon determining to abort the lane change, the computer 105 performs an abort phase and waits for the first target vehicle 205a to pass or exits the lane-change mode.

Upon determining to complete the lane change, the computer 105 performs the lane-line crossing phase and then the target-lane phase, and then the computer 105 exits the lane-change mode.

In each phase described below, the computer 105 is programmed to actuate the component according to the adjusted control input $u_t$ (determined as described above with respect to FIGS. 3 and 4). Consistent with the foregoing description, the computer 105 may actuate the component according to the first adjusted control input $u_{t,\infty}$ in response to the first adjusted control input $u_{t,\infty}$ existing, and actuate the component according to the second adjusted control input $u_{t,k*}$ in response to the first adjusted control input $u_{t,\infty}$ not existing. For example, the computer 105 may actuate the propulsion system 120 and the brake system 125 according to an input acceleration of the adjusted control input $u_t$, as described above. Additionally, the computer 105 may actuate the user interface 135 to output a message (e.g., recommending the adjusted control input $u_t$ and/or stating the finite number k* of timesteps for which the constraint is satisfiable).

The computer 105 is programmed to perform the phases in response to the initiation of the lane-change mode by the host vehicle 100. For the purposes of this disclosure, the "lane-change mode" is defined as a series of steps in which the host vehicle 100 is preparing to perform or performing a lane change. The computer 105 may initiate the lane-change mode in response to an input by the operator or an instruction to perform the lane change by an autonomous-operation algorithm. For example, the operator may activate a turn signal, indicating an intention to change lanes in the direction of the turn signal. For another example, the operator may provide an input instructing an ADAS feature (e.g., an automated lane-change feature) to perform the lane change.

The computer 105 may store a flag in memory indicating the status of the lane-change mode. The flag may be a binary variable indicating whether the lane-change mode is on (e.g., "1") or off (e.g., "0"). In response to the initiation of the lane-change mode, the computer 105 may set the flag to on.

In the initiation phase, the computer 105 is programmed to actuate the component (e.g., the steering system 130) to maneuver the host vehicle 100 to within a preset distance from a lane line 230 dividing the current lane 215 and the target lane 220, which will be referred to as the dividing lane line 230, as in the following expression:

$$Y^{ego} \geq L - \frac{w_h}{2} - w_{lc}$$

in which $w_{lc}$ is the preset distance. The preset distance may be chosen such that the host vehicle 100 is off center within the current lane 215 toward the target lane 220, and is visibly off center as seen by the first target vehicle 205a. During the initiation phase, the computer 105 may also actuate the component (e.g., the propulsion system 120 and/or brake system 125) subject to the longitudinal constraint with respect to the third target vehicle 205c, as described above. In response to the host vehicle 100 being within the preset distance from the dividing lane line 230, the computer 105 transitions from the initiation phase to the negotiation phase.

In the negotiation phase, the computer 105 is programmed to actuate the component (e.g., the steering system 130) to maintain the host vehicle 100 within the preset distance from the dividing lane line 230 (while determining the maximum number of timesteps as described below). During the negotiation phase, the computer 105 may also actuate the component (e.g., the propulsion system 120 and/or brake system 125) subject to the longitudinal constraint with respect to the third target vehicle 205c, as described above.

The computer 105 is programmed to, during the negotiation phase (i.e., while maintaining the host vehicle 100 within the preset distance from the dividing lane line 230), determine a maximum number of timesteps for which the at least one constraint on the host kinematic state and the target kinematic state is satisfiable (e.g., in the manner described above with respect to FIG. 4). The computer 105 may determine a plurality of candidate maximum numbers of timesteps for the respective constraints. In that case, the maximum number of timesteps is a smallest value of the candidate maximum numbers. For example, the computer 105 may determine a first candidate maximum number of timesteps with respect to the longitudinal constraint for the first target vehicle 205a, a second maximum number of timesteps with respect to the longitudinal constraint for the second target vehicle 205b, and a third maximum number of timesteps with respect to the longitudinal constraint for the third target vehicle 205c. The computer 105 may determine each of the first, second, and third candidate numbers of timesteps in the manner described above with respect to FIG. 4, using the respective constraints. The smallest of the first, second, and third candidate numbers of timesteps is the maximum number of timesteps.

The computer 105 may determine when to exit the negotiation phase and which phase to enter next based on the maximum number of timesteps. The computer 105 is programmed to, in response to the maximum number of timesteps exceeding a timestep threshold, transition from the negotiation phase to the lane-line crossing phase. The timestep threshold may be chosen to provide the host vehicle 100 sufficient time to exit the current lane 215 if the third target vehicle 205c slows, to slow or return to the current lane 215 if the second target vehicle 205b slows, and accelerate ahead of the first target vehicle 205a.

The computer 105 is programmed to remain in the negotiation phase for up to a time threshold. The time threshold may be chosen to provide sufficient time for the first target vehicle 205a to reduce speed and permit the host vehicle 100 to enter the target lane 220, if that is what the first target vehicle 205a choose to do. The computer 105 may iteratively re-determine the maximum number of timesteps for as long as the computer 105 remains in the negotiation phase (e.g., at each timestep). The computer 105 actuates the component according to the adjusted control input to travel in the current lane 215 while determining the maximum number of timesteps (e.g., to maintain the host vehicle 100 within the preset distance from the dividing lane line 230). The computer 105 is programmed to, in response to maximum number of timesteps being below the timestep threshold and the length of time spent in the negotiation phase being below the time threshold, remain in the negotiation phase. The computer 105 is programmed to, in response to the maximum number of timesteps being below the timestep threshold for at least the time threshold, transition from the negotiation phase to the abort phase.

In the abort phase, the computer 105 is programmed to actuate the component (e.g., the steering system 130) to refrain from performing the lane change. For example, the computer 105 may actuate the component to center the host vehicle 100 in the current lane 215 (e.g., travel at more than the preset distance from the dividing lane line 230). During the abort phase, the computer 105 may also actuate the component (e.g., the propulsion system 120 and/or brake system 125) subject to the longitudinal constraint with respect to the third target vehicle 205c, as described above.

During the abort phase, the computer 105 may determine whether the first target vehicle 205a (i.e., the trailing vehicle in the target lane 220) has passed the host vehicle 100. The computer 105 may, in response to the first target vehicle 205a passing the host vehicle 100, transition from the abort phase to the initiation phase (i.e., move to within the preset distance of the dividing lane line 230 and then enter the negotiation phase). In that case, the first target vehicle 205a is treated as the second target vehicle 205b (i.e., as the leading vehicle in the target lane 220), and another target vehicle 205 (not shown) may be treated as the first target vehicle 205a (i.e., the trailing vehicle in the target lane 220). The computer 105 may, in response to the first target vehicle 205a remaining behind the host vehicle 100, remain in the abort phase. Alternatively, during the abort phase, the computer 105 may exit the lane-change mode and set the flag to off.

In the lane-line crossing phase, the computer 105 is programmed to actuate the component (e.g., the steering system 130) to perform the lane change from the current lane 215 to the target lane 220. The computer 105 actuates the component according to the adjusted control input to perform the lane change, in the manner described above with respect to FIG. 4. FIG. 2 shows the host vehicle 100 crossing the dividing lane line 230 at 100' and 100", with the first target vehicle 205a leaving space for the host vehicle 100 to enter the target lane 220 at 205a' and 205a". During the lane-line crossing phase, the computer 105 may also actuate the component (e.g., the propulsion system 120 and/or brake system 125) subject to the longitudinal constraints with respect to the first target vehicle 205a, the second target vehicle 205b, and the third target vehicle 205c, as described above. In response to the host vehicle 100 fully entering the target lane 220 (i.e., $Y^{ego} > L + w_h/2$), the computer 105 transitions from the lane-line crossing phase to the target-lane phase.

In the target-lane phase, the computer 105 is programmed to actuate the component (e.g., the steering system 130) according to the adjusted control input to travel in the target lane 220 after performing the lane change (i.e., after exiting the lane-line crossing phase). The computer 105 may actuate the steering system 130 to move the host vehicle 100 away from the dividing lane line 230 toward the center of the target lane 220. During the target-lane phase, the computer 105 may also actuate the component (e.g., the propulsion system 120 and/or brake system 125) subject to the longitudinal constraint with respect to the second target vehicle 205b, as described above.

The computer 105 is programmed to, in response to the host vehicle 100 being within a threshold distance of the center of the target lane 220 (i.e., $|Y^{ego} - 1.5 \, L| \leq \varepsilon$, in which $\varepsilon$ is the threshold distance), transition out of the target-lane phase and exit the lane-change mode. The threshold distance $\varepsilon$ may be chosen to indicate that the host vehicle 100 is centered in the target lane 220. Upon exiting the lane-change mode, the computer 105 may actuate the components using an ADAS feature not responsible for lane changing (e.g., an adaptive cruise control algorithm). Upon exiting the target-lane phase, the computer 105 may also actuate the component (e.g., the propulsion system 120 and/or brake system 125) subject to the longitudinal constraint with respect to the second target vehicle 205b, as described above. In response to exiting the lane-change mode, the computer 105 may set the flag to off.

Figure 5:
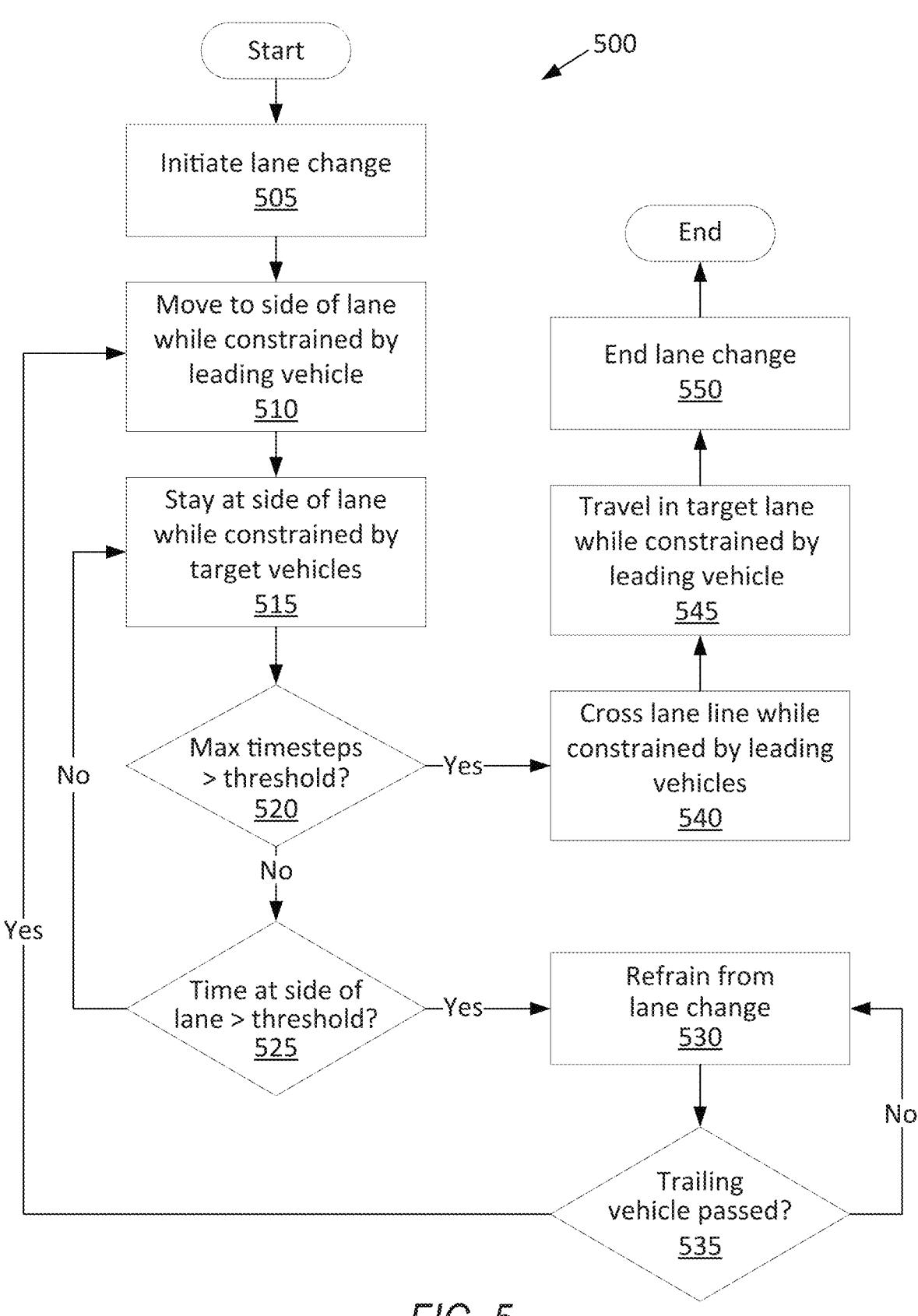
FIG. 5 is a flowchart of an example process for controlling the host vehicle to perform the lane change.

FIG. 5 is a flowchart illustrating an example process 500 for controlling the host vehicle 100 to perform the lane change. The memory of the computer 105 stores executable instructions for performing the steps of the process 500 and/or programming can be implemented in structures such as mentioned above. As a general overview of the process 500, the computer 105 initiates the lane-change mode, maneuvers the host vehicle 100 to within the preset distance from the dividing lane line 230, and maintains the host vehicle 100 within the preset distance from the dividing lane line 230 while determining the maximum number of timesteps for which the at least one constraint on the host kinematic state and target kinematic state is satisfiable. In response to the maximum number of timesteps being below the timestep threshold for at least the time threshold, the computer 105 actuates the host vehicle 100 to refrain from performing the lane change and waits for the first target vehicle 205a to pass the host vehicle 100 before attempting the lane change again. In response to the maximum number of timesteps exceeding the timestep threshold, the computer 105 performs the lane change and begins traveling in the target lane 220.

The process 500 begins in a block 505, in which the computer 105 receives the initiation of the lane-change mode. The computer 105 enters the lane-change mode in response to the initiation of the lane-change mode, as described above.

Next, in a block 510, the computer 105 actuates the component to maneuver the host vehicle 100 to within the preset distance from the dividing lane line 230 dividing the current lane 215 and the target lane 220, as described above with respect to the initiation phase.

Next, in a block 515, the computer 105 actuates the component to maintain the host vehicle 100 within the preset distance from the dividing lane line 230 and, at the same time, determines a maximum number of timesteps for which at least one constraint on the host kinematic state and the target kinematic state e is satisfiable, as described above with respect to the negotiation phase.

Next, in a decision block 520, the computer 105 determines whether the maximum number of timesteps exceeds the timestep threshold, as described above. In response to the maximum number of timesteps exceeding the timestep threshold, the process 500 proceeds to a block 540. In response to the maximum number of timesteps being below the timestep threshold, the process 500 proceeds to a decision block 525.

In the decision block 525, the computer 105 determines whether the length of time that the host vehicle 100 has been in the negotiation phase (i.e., since the first execution of the block 515) exceeds the time threshold. In response to the length of time being below the time threshold, the process 500 returns to the block 515 to continue the negotiation phase. In response to the length of time exceeding the time threshold, the process 500 proceeds to a block 530.

In the block 530, the computer 105 actuates the component to refrain from performing the lane change, as described above with respect to the abort phase.

Next, in a decision block 535, the computer 105 determines whether the first target vehicle 205a (i.e., the trailing vehicle in the target lane 220) has passed the host vehicle 100. In response to the first target vehicle 205a passing the host vehicle 100, the process 500 returns to the block 510 for the host vehicle 100 to re-attempt the lane change. In response to the first target vehicle 205a remaining behind the host vehicle 100, the process 500 returns to the block 530 to continue in the abort phase.

In the block 540, the computer 105 actuates the component to perform the lane change from the current lane 215 to the target lane 220, as described above with respect to the lane-line crossing phase.

Next, in a block 545, the computer 105 actuates the component to center the host vehicle 100 in the target lane 220, as described above with respect to the target-lane phase.

Next, in a block 550, the computer 105 exits the lane-change mode and continues traveling in the target lane 220, as described above. After the block 550, the process 500 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," "upon exiting," etc. indicates a causal relationship, not merely a temporal relationship. The adjectives "first," "second," and "third" are used throughout this document as identifiers and are not intended to signify importance, order, or quantity. Terms such as "front," "forward," "longitudinal," "back," "rearward," "left," "right," "lateral," "upward," "downward," "vertical," etc., are understood relative to the host vehicle 100. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

in response to an initiation of a lane-change mode by a host vehicle, determine a maximum number of timesteps for which at least one constraint on a host kinematic state of the host vehicle and a target kinematic state of at least one target vehicle is satisfiable; and in response to the maximum number of timesteps exceeding a timestep threshold, actuate a component of the host vehicle to perform a lane change from a current lane of the host vehicle to a target lane adjacent to the current lane.

2. The computer of claim 1, wherein the instructions further include instructions to, in response to the maximum number of timesteps being below the timestep threshold for at least a time threshold, actuate the component of the host vehicle to refrain from performing the lane change.

3. The computer of claim 1, wherein the instructions further include instructions to, in response to the initiation of the lane-change mode, actuate the component to maneuver the host vehicle to within a preset distance from a lane line dividing the current lane and the target lane.

4. The computer of claim 3, wherein the instructions further include instructions to actuate the component to maintain the host vehicle within the preset distance from the lane line while determining the maximum number of timesteps.

5. The computer of claim 1, wherein the at least one constraint includes a plurality of constraints, and each constraint is on the host kinematic state and a respective target kinematic state of a respective target vehicle.

6. The computer of claim 5, wherein the instructions further include instructions to determine a plurality of candidate maximum numbers of timesteps for the respective constraints, the maximum number of timesteps being a smallest value of the candidate maximum numbers.

7. The computer of claim 1, wherein the at least one target vehicle includes a leading vehicle in the current lane.

8. The computer of claim 7, wherein the at least one target vehicle includes a leading vehicle in the target lane.

9. The computer of claim 7, wherein the at least one target vehicle includes a trailing vehicle in the target lane.

10. The computer of claim 1, wherein the instructions further include instructions to:

determine an adjusted control input for the component of the host vehicle that maximizes the maximum number of timesteps, the determination of the adjusted control input being based on a nominal control input, the host kinematic state, and the target kinematic state; and actuate the component according to the adjusted control input.

11. The computer of claim 10, wherein the instructions further include instructions to actuate the component according to the adjusted control input to perform the lane change.

12. The computer of claim 10, wherein the instructions further include instructions to actuate the component according to the adjusted control input to travel in the current lane while determining the maximum number of timesteps.

13. The computer of claim 10, wherein the instructions further include instructions to actuate the component according to the adjusted control input to travel in the target lane after performing the lane change.

14. The computer of claim 10, wherein the instructions further include instructions to recursively determine for each timestep a set of possible host kinematic states at that timestep for which the at least one constraint is satisfied at that timestep, the set of possible host kinematic states at the timestep being a subset of a set of possible host kinematic states at an immediately previous timestep.

15. The computer of claim 14, wherein the instructions further include instructions to perform the recursive determination of the set of possible host kinematic states until a timestep at which the set of possible host kinematic states is empty, the maximum number of timesteps being indicated by the timestep at which the set of possible host kinematic states is empty.

16. A method comprising:

in response to an initiation of a lane-change mode by a host vehicle, determining a maximum number of timesteps for which at least one constraint on a host kinematic state of the host vehicle and a target kinematic state of at least one target vehicle is satisfiable; and in response to the maximum number of timesteps exceeding a timestep threshold, actuating a component of the host vehicle to perform a lane change from a current lane of the host vehicle to a target lane adjacent to the current lane.

17. The method of claim 16, further comprising, in response to the maximum number of timesteps being below the timestep threshold for at least a time threshold, actuating the component of the host vehicle to refrain from performing the lane change.

18. The method of claim 16, further comprising, in response to the initiation of the lane-change mode, actuating the component to maneuver the host vehicle to within a preset distance from a lane line dividing the current lane and the target lane.

19. The method of claim 16, wherein the at least one constraint includes a plurality of constraints, and each constraint is on the host kinematic state and a respective target kinematic state of a respective target vehicle, the method further comprising determining a plurality of candidate maximum numbers of timesteps for the respective constraints, the maximum number of timesteps being a smallest value of the candidate maximum numbers.

20. The method of claim 16, wherein the at least one target vehicle includes a leading vehicle in the current lane, a leading vehicle in the target lane, and a trailing vehicle in the target lane.

* * * * *